United States Patent [19]
Florek

[11] 3,856,341
[45] Dec. 24, 1974

[54] HAY HOOK AND TWINE CUTTER
[76] Inventor: Florian F. Florek, 126 Marker St., Edinboro, Pa. 16412
[22] Filed: Feb. 26, 1973
[21] Appl. No.: 336,019

[52] U.S. Cl............... 294/24, 7/14.3, 294/26, 306/39
[51] Int. Cl.............................................. B65g 7/12
[58] Field of Search.......... 294/2, 24, 26; 7/1, 14.3, 7/14.4, 14.55; 306/31, 39, 40

[56] References Cited
UNITED STATES PATENTS
| | | | |
|---|---|---|---|
| 667,000 | 1/1901 | Bridges | 306/39 |
| 676,961 | 6/1901 | Parks | 7/14.3 |
| 845,233 | 2/1907 | Harrington | 306/39 X |
| 2,382,774 | 8/1945 | Coffin | 7/14.3 X |

FOREIGN PATENTS OR APPLICATIONS
10,791  12/1928  Australia.............................. 7/14.3

Primary Examiner—Evon C. Blunk
Assistant Examiner—Johnny D. Cherry

[57] ABSTRACT

The specification discloses a tool for handling hay bales and the like made up of an elongated handle, two platelike members lying in parallel planes being distorted to receive said handle between them, and said platelike members being fixed to said handle. A part of a blade is received between the plates adjacent at one edge of said plates. The one part of said plates remove from the blade are formed into a hook curving backwardly toward said handle and a fork member may be attached to the end of said end adjacent said hook.

1 Claim, 1 Drawing Figure

PATENTED DEC 24 1974
3,856,341
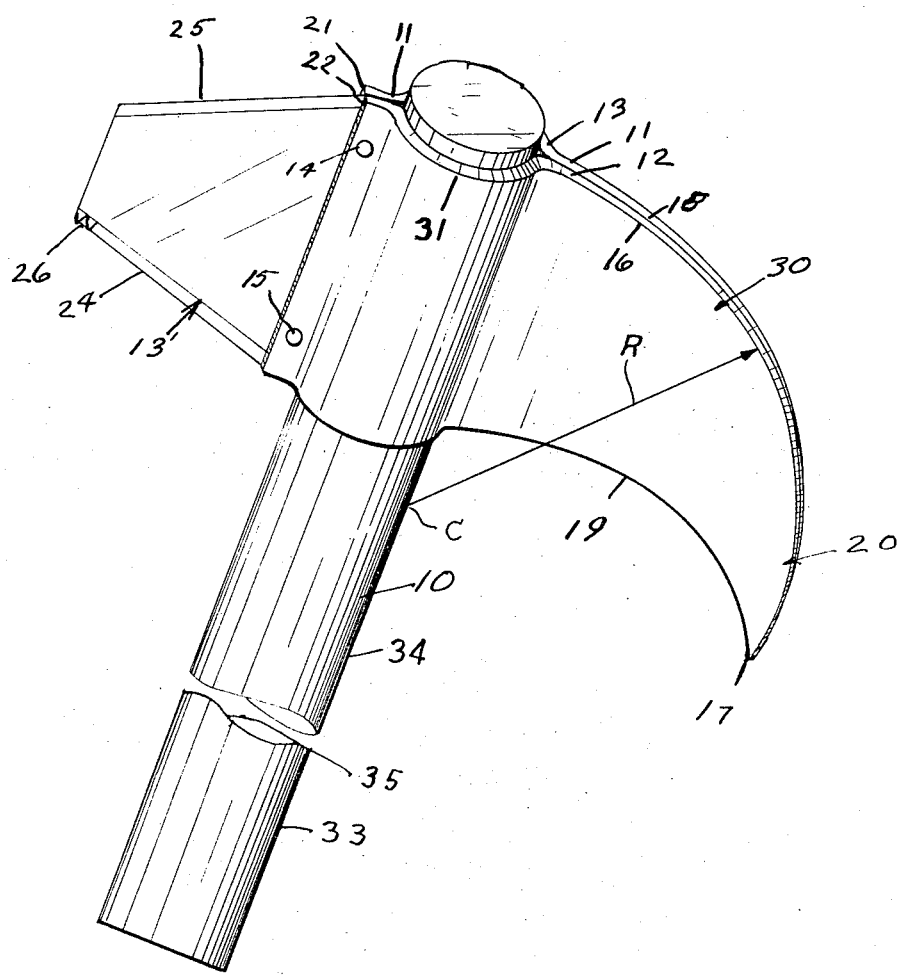
Inventor
FLORIAN F. FLOREK
By
Charles L. Lovechek Attorney

3,856,341

HAY HOOK AND TWINE CUTTER

This is a continuation, of application Ser. No. 138,935, filed Apr. 30, 1971, now abandoned.

OBJECTS OF THE INVENTION

It is an object of the invention to provide an improved hay hook.

Another object of the invention is to provide a combination hay hook and cutting blade for cutting twine.

Another object of the invention is to provide an improved hay tool.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

DESCRIPTION OF THE DRAWING

The drawing shows an isometric view of the tool according to the invention.

DETAILED DESCRIPTION OF THE DRAWING

Now with more particular reference to the drawing, a tool for handling hay bales or the like is shown. The tool has a handle 10 which may be made of two pieces of metal tubing indicated at 33 and 34, which may be connected together by a threaded joint indicated generally at 35, or the tubing could be connected by any suitable type of joint familiar to those skilled in the art.

The head 13 is made up of two plates 11 and 12. Plates 11 and 12 lie generally in parallel planes and rest on each other to form the point or hook 20. The plates may be welded together or otherwise formed together. The plates are distorted outward from each other at 31 to form an opening for the handle and the ends at 21 and 22 terminate adjacent each other in slightly spaced relation to receive the sickle section 13'. The sickle section has teeth 26 and cutting edges 24 and 25. The edges 24 and 25 will have teeth continually along their surface to cut twine.

Screws or rivets 14 and 15 pass through the ends 21 and 22 and hold the ends together with the sickle section therebetween.

The hook 20 will have a curve of approximately four-inch radius indicated at 18 and 16 and having a center of curvature at a point C on the head spaced from the handle and a radius of curvature indicated at R with an internal curve indicated at 19 of a slightly larger radius. The plates terminate in a point 17.

To use the tool according to the invention, the operator will attach a suitable length extension 33 onto the handle 10 and drag a bale of hay by inserting the point 17 of the head 30 into the bale and drag the bale to the desired point. He will then cut the twine by means of the knife blade 13'.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A hay hook and twine cutter combination comprising
    a handle,
    a first plate and a second plate,
    and a cutter,
    said first plate and said second plate each having a flat hook part, a flat cutter receiving part, and a curved handle engaging part between said hook part and said cutter receiving part,
    said handle engaging parts of said plates curving outwardly from each other and providing a space for a handle therebetween,
    said cutter receiving parts receiving an edge of said cutter therebetween and fastening means holding said cutter to said cutter receiving parts,
    said cutter having two sharpened edges extending from said cutter receiving parts and diverging toward each other,
    an end of said handle being received between said handle engaging parts of said plates and said hook curving toward said handle,
    and means holding said hook parts of said plates together,
    the outside of said hook part being defined by a curved outer surface defining an arc of approximately 90° of a circle,
    said arc terminating adjacent said handle at one end and at the point of said hook at the other end,
    a second arc defining the other side of said hook,
    said second arc starting at said handle and terminating at said point and defining the opposite side of said hook.

* * * * *